United States Patent [19]
Yamagishi et al.

[11] Patent Number: 5,452,898
[45] Date of Patent: Sep. 26, 1995

[54] GOLF BALL

[75] Inventors: Hisashi Yamagishi, Yokohama; Yoshinori Egashira, Hidaka; Hideo Watanabe, Yokohama, all of Japan

[73] Assignee: Bridgestone Sports Co., Ltd., Tokyo, Japan

[21] Appl. No.: 208,705

[22] Filed: Mar. 11, 1994

[30] Foreign Application Priority Data

Mar. 12, 1993 [JP] Japan .................................. 5-079096

[51] Int. Cl.⁶ .................................................. A63B 37/00
[52] U.S. Cl. ...................... 273/220; 273/235 R
[58] Field of Search ............... 273/62, 218, 220, 273/235 R, 230

[56] References Cited

U.S. PATENT DOCUMENTS

| | | | |
|---|---|---|---|
| 4,683,257 | 7/1987 | Kakiuchi et al. | 273/218 X |
| 4,858,924 | 8/1989 | Saito et al. | 273/62 |
| 4,919,434 | 4/1990 | Saito | 273/235 R |

Primary Examiner—George J. Marlo
Attorney, Agent, or Firm—Sughrue, Mion, Zinn, Macpeak & Seas

[57] ABSTRACT

A golf ball comprising a core and a cover enclosing the core, the hardness of said core divided by the hardness of the ball being 1.00 to 1.20 wherein the core hardness and ball hardness are distortions measured in mm of the core and ball under a load of 100 kg. The cover is a one-layer construction, has a thickness of 1.85 to 2.35 mm, consists essentially of an ionomer resin, and has a shore D hardness of up to 60.

6 Claims, 1 Drawing Sheet

U.S. Patent
Sep. 26, 1995
5,452,898
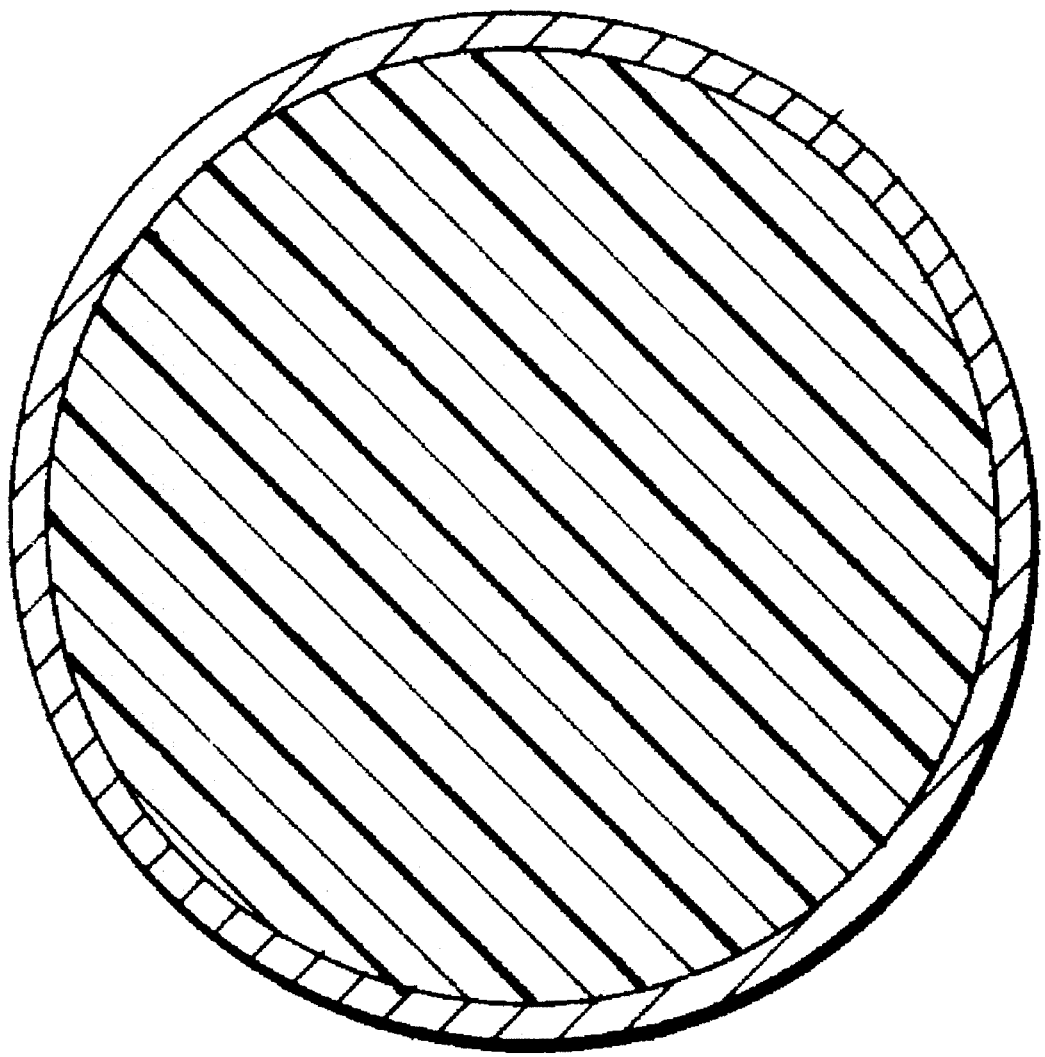

GOLF BALL

BACKGROUND OF THE INVENTION

1. Field of the Invention

This invention relates to a solid golf ball having improved feel and spin performance.

2. Prior Art

As compared with wound golf balls, solid golf balls such as two-piece golf balls are advantageous in gaining a flying distance since they fly along the trajectory of a straight ball when hit by both drivers and irons. This advantage is mainly attributable to their structure. Because their configuration is less receptive to spin, the solid golf balls are given a straight ball trajectory and yield more run, resulting in an increased total flying distance.

In turn, the solid golf ball tends to draw a "flier" path on an iron shot since it is less receptive to spin and does not readily stop on the green. Because of such characteristics, the solid golf ball, such as two-piece ball, is not preferred by experienced players.

Therefore, there is a need for a solid golf ball having improved spin properties and allowing the player to aim the pin dead with an iron. The increased flying distance inherent to the solid golf ball should be maintained and of course, the ball should have a pleasant feel.

SUMMARY OF THE INVENTION

Therefore, an object of the present invention is to provide a solid golf ball such as a two-piece golf ball which is improved in feel, spin properties and iron control without detracting from the trajectory and flying distance inherent to the solid golf ball. The term iron control is the controllability of a ball on an iron shot, more specifically stop on the green.

Briefly stated, the present invention pertains to a solid golf ball comprising a core and a cover enclosing the core. The hardness of the core, cover and ball are referred to as core hardness, cover hardness, and ball hardness, respectively. According to the invention, the core hardness divided by the ball hardness is in the range of 1.00 to 1.20. The cover has a radial thickness of 1.85 to 2.35 mm. This parameter control leads to a solid golf ball satisfying the requirements of flying distance, feel and spin.

Consider the spin mechanism of golf balls which are made of the same materials, but which have a different hardness. Provided that the club head speed and the cover material are identical, the coefficient of friction between the ball and the club face is identical and hence, an identical frictional force is exerted therebetween. Distortion is only different due to the differential hardness. Thus, the distance between the center of gravity and the ball-club contact point is different. The harder the ball, the longer is the contact point distance. The softer the ball, the shorter is the contact point distance. Thus, harder balls are more receptive to spin.

The spinning mechanism associated with an iron suggests that the spin quantity can be increased by increasing the ball hardness. Increasing the ball hardness, however, gives a harder feel, exacerbating the hitting feel. The spin quantity can also be increased by making the cover softer. A softer cover, however, deprives the ball of repulsion, resulting in a loss of initial speed and flying distance.

Attempting to increase the spin quantity for improving spin properties by using a soft material, typically a material having a Shore D hardness of 60 or lower as the cover, we found that a low hardness core lowers repulsion, resulting in a loss of flying distance on hitting. Quite unexpectedly, we have found that by adjusting the ratio of core hardness to ball hardness to range from 1.00 to 1.20 and the cover thickness to range from 1.85 mm to 2.35 mm, the golf ball, whose cover is made of a softer material, is improved in iron control (that is, stop on the green) without deterring from the feel and flying distance and without losing the trajectory and flying distance on a driver shot inherent to solid golf balls.

DETAILED DESCRIPTION OF THE PREFERRED EMBODIMENTS

In the golf ball comprising a spherical solid core enclosed in a core according to the present invention, the core hardness divided by the ball hardness is in the range of 1.00 to 1.20 and the cover has a thickness of 1.85 to 2.35 mm.

The core hardness and ball hardness are distortions (in mm) of the core and ball under a load of 100 kg. By controlling the core hardness/ball hardness so as to fall in the range between 1.00 and 1.20, especially between 1.00 and 1.15, the solid golf ball is improved in feel, flying distance and spin characteristics. If the core hardness/ball hardness is less than 1.00, the feel becomes unpleasant. If the core hardness/ball hardness exceeds 1.20, the ball loses a quick stop on the green.

The core hardness is preferably controlled to a distortion (as defined above) of 2.3 to 3.0 mm, especially 2.12 to 2.6 mm. A distortion of more than 3.0 mm would lead to losses of repulsion and flying performance and give too soft of a feel.

The golf ball of the invention is applied to a two-piece golf ball, which has one core, and also to a multi-piece golf ball having two or more cores, such as a three-piece golf ball which has an inner core and an outer core. In this case, the core hardness is defined as the hardness of the whole core. That is, the core hardness in case of a three piece ball is the hardness of the whole core consisting of an inner core and an outer core.

The cover has a Shore D hardness of up to 60, especially 55 to 60. A cover hardness of more than 60 would adversely affect spin characteristics and stop on the green. A cover with too low hardness would result in poor repulsion and a loss of flying distance. The lower limit of 55 is recommended for the cover hardness.

According to the invention, the cover has a radial thickness of 1.85 to 2.35 mm, especially 1.85 to 2.10 mm. Outside the range, the objects of the invention cannot be achieved. A cover of thinner than 1.85 mm is less resistant against top damage and liable to be broken. A cover of thicker than 2.35 mm leads to losses of repulsion and flying performance and gives a dull feel.

In one preferred embodiment of the invention, the golf ball has a spin factor of 1.0 to 1.5. The spin factor is defined as follows. The golf ball has a spin quantity when hit by a pitching wedge (referred to as wedge spin quantity) and a spin quantity when hit by a driver (referred to as driver spin quantity). The spin factor is obtained by dividing the ratio of the wedge spin quantity to the driver spin quantity by the ball hardness. Thus, a spin factor smaller than unity means that the ball has greater spin with the driver and less spin with the pitching wedge. The former indicates that the trajectory is lofted and the flying distance is reduced. The latter indicates that when hit with an iron, the ball draws a flier-like trajectory and flies too much. A greater spin factor is then desirable. Then the object of the invention, to render the ball less receptive to spin with a driver and more respective to spin with an iron, is effectively accomplished. However, too great of a spin factor would exacerbate ball control on an iron shot because the ball can be moved back too much due to back spin. For this reason, the spin factor is preferably in the range between 1.0 and 1.5.

The golf ball of the invention is advantageously applied to two-piece golf balls. It is also applicable to multi-core golf balls such as three-piece golf balls. The material and preparation of the core and cover are not critical. The components may be made of any of well-known materials insofar as the requirements of the invention are met.

The core of the present solid golf ball is formed from a rubber composition by a conventional method while properly adjusting the component proportions and vulcanizing conditions. The composition generally includes a base rubber, a crosslinking agent, a co-crosslinking agent, an inert filler, and other components. The base rubber may be selected from natural and synthetic rubbers conventionally used in the manufacture of solid golf balls. Preferably the base rubber is 1,4-polybutadiene rubber containing at least 40% of cis-configuration, optionally in admixture with natural rubber, polyisoprene rubber or styrene-butadiene rubber. The crosslinking agent is preferably selected from organic peroxides such as dicumyl peroxide and di-t-butyl peroxide, with the dicumyl peroxide being more preferred. Preferably the crosslinking agent is blended in an amount of about 0.5 to 3 parts, more preferably about 0.8 to 1.5 parts by weight per 100 parts by weight of the base rubber. Non-limiting examples of the co-crosslinking agent include metal salts of unsaturated fatty acids, especially zinc and magnesium salts of unsaturated fatty acids having 3 to 8 carbon atoms, such as acrylic acid and methacrylic acid. Zinc acrylate is the most preferred salt. The co-crosslinking agent is preferably blended in an amount of about 24 to 38 parts, more preferably about 28 to 34 parts by weight per 100 parts by weight of the base rubber. Examples of the inert filler include zinc oxide, barium sulfate, silica, calcium carbonate, and zinc carbonate, with the zinc oxide being most often used. The amount of the filler blended depends on the desired specific gravity of the core and cover, ball weight, and other factors although it generally ranges from about 10 to about 60 parts by weight per 100 parts by weight of the base rubber.

These components are blended to form a core-forming rubber composition which is kneaded by means of a conventional kneading machine such as a Banbury mixer and roll mill and then compression or injection molded in a spherical mold cavity. The molded composition is cured by heating it at a sufficient temperature for the crosslinking and co-crosslinking agents to exert their function (for example, about 130° to 170° C. when the crosslinking agent is dicumyl peroxide and the co-crosslinking agent is zinc acrylate). In this way, a solid spherical core having a diameter of 37 to 40 mm is prepared.

In case of a two-layer core, the inner core is formed from the above rubber composition and the outer core is also formed from the above rubber composition or a resin material such as an ionomer resin or ionomer resin mixture. The outer core can be formed on the inner core by compression or injection molding. The diameter of the inner core is preferably in the range of 27.0 to 38.0 mm, more preferably 28.0 to 36.0 mm, and the thickness of the outer core is preferably in the range of 0.5 to 6.5 mm, more preferably 1.5 to 5.5 mm. The total diameter is preferably in the range of 37 to 40 mm.

The solid core is enclosed in the cover by any desired technique, for example, by enclosing the core in a pair of semi-spherical shell halves followed by heat compression molding. Alternatively the core is directly covered with a cover material by injection molding.

The golf ball of the invention has a standard size and weight according to golf regulations.

There has been described a golf ball which is improved in feel and spin characteristics while maintaining the flying distance inherent to solid golf balls and which allows the player to "aim the pin dead".

EXAMPLE

Examples of the present invention are given below by way of illustration and not by way of limitation.

Examples 1–3 & Comparative Examples 1–4

Cores having a hardness as shown in Table 1 were molded by vulcanizing in a mold rubber compositions comprising cis-1,4-polybutadiene rubber, zinc acrylate, zinc oxide, and dicumyl peroxide. The hardness reported is a distortion in millimeter under a load of 100 kilograms.

The cores were enclosed in covers which were formed from mixtures of ionomer resins. The blending proportion of ionomer resins was changed to form covers having varying hardness (Shore D scale) as shown in Table 2. In this way, there were obtained large-size two-piece golf balls having a hardness as shown in Table 3. The hardness reported is again a distortion in millimeter under a load of 100 kilograms.

The base composition for the core consisted of the following components.

|  | Parts by weight |
| --- | --- |
| cis-1,4-polybutadiene rubber (BR01) | 100 |
| zinc acrylate | 33.2 |
| zinc oxide | 10 |
| barium sulfate | 9.7 |
| anti-oxidant | 0.2 |
| dicumyl peroxide | 0.9 |

Cores having varying hardness and specific gravity were obtained by varying the amounts of zinc acrylate and barium sulfate as shown in Table 1.

TABLE 1

| Core hardness | Cover thickness | | | |
| --- | --- | --- | --- | --- |
|  | 1.80 mm | 1.87–1.90 mm | 2.00–2.05 mm | 2.30 mm |
| 2.00–2.05 mm | 38.5/4.6 | — | 39.0/7.0 | — |
| 2.50 mm | — | — | — | 34.3/11.7 |
| 2.60–2.65 mm | — | 33.5/8.5 | 33.2/9.7 | — |
| 2.70–2.76 mm | — | 32.8/8.8 | 32.4/10.0 | — |
| 3.15 mm | — | — | 29.4/11.4 | — |

*amounts of zinc acrylate/barium sulfate in parts by weight

The base composition for the cover was a 50/50 (by weight) mixture of Himilan 1650 and Surlyn 8120. Covers having varying hardness were obtained while blending Himilan 1650 and Surlyn 8120 in a ratio as shown in Table 2.

TABLE 2

| Cover hardness (Shore D) | Resin mix | Weight ratio |
| --- | --- | --- |
| 56 | H1650/S8120 | 40/60 |
| 57 | H1650/S8120 | 50/50 |
| 63 | H1605/H1706/H1557 | 50/30/20 |
| 64 | H1605/H1706/H1557 | 50/40/10 |
| 65 | H1650/H1706 | 50/50 |

*H: Himilan commercially available from Mitsui DuPont Chemical.
S: Surlyn commercially available from E. I. DuPont The golf balls were examined for fly, stop on the green, and feel by the following procedures.

Fly test

Using a swing robot manufactured by True Temper Co., the ball was hit by a driver at a head speed of 45 m/s and by an iron at a head speed of 38 m/s to measure the spin quantity and flying distance. The spin quantity was determined by taking a photograph of the ball immediately after impact followed by image analysis.

Stop on the green test

Using a swing robot manufactured by True Temper Co., the ball was hit by a pitching wedge so as to fly directly on the green. The distance between the landing and stop positions was measured. A negative value is the distance the ball covers due to back spin. A positive value is a run in a flying direction.

Feel test

In a sensory test, an experienced player hit the ball at a head speed of 43 m/s. The ball was read "○" for good feel, "Δ" for somewhat unpleasant feel and "X" for unpleasant feel.

TABLE 3

| | Example | | | Comparative Example | | | |
| --- | --- | --- | --- | --- | --- | --- | --- |
| | 1 | 2 | 3 | 1 | 2 | 3 | 4 |
| Core hardness (mm) | 2.60 | 2.70 | 2.65 | 2.76 | 3.15 | 2.00 | 2.05 |
| Ball hardness (mm) | 2.50 | 2.48 | 2.30 | 2.25 | 2.55 | 2.09 | 2.01 |
| Core/ball hardness ratio | 1.04 | 1.09 | 1.15 | 1.23 | 1.24 | 0.96 | 1.02 |
| Cover thickness (mm) | 1.90 | 1.87 | 2.05 | 2.03 | 2.05 | 2.01 | 1.80 |
| Cover hardness (Shore D) (degrees) | 56 | 57 | 57 | 64 | 65 | 63 | 56 |
| Spin | | | | | | | |
| #PW | 9358 | 9305 | 9327 | 8975 | 8780 | 9138 | 9509 |
| #W1 | 2994 | 2956 | 2977 | 2940 | 2875 | 3141 | 3064 |
| Spin factor* | 1.250 | 1.269 | 1.362 | 1.356 | 1.197 | 1.392 | 1.544 |
| Feel | ○ | ○ | ○ | Δ | ○ | X | X |
| Driver flying distance (m) | 225.0 | 223.5 | 226.5 | 224.5 | 226.0 | 225.0 | 220.0 |
| Landing – to – stop distance (m) | −0.5 | 0.0 | 0.0 | 2.5 | 3.0 | 2.5 | −1.0 |
| Stop on the green | ○ | ○ | ○ | X | X | Δ | ○ |

$$*\left(\frac{\text{pitching wedge spin quantiy}}{\text{driver spin quantity}}\right)/\text{ball hardness?}$$

Example 4

An inner core having a diameter of 35.0 mm was prepared by the same method as in Example 1. An outer core having a thickness of 1.9 mm was formed on the inner core by injection molding. The outer core material was an ionomer resin mixture of Himilan 1650 and Himilan 1706 at a weight ratio of 50:50.

By injection molding an ionomer resin mixture of Himilan 1650 and Surlyn 8120 at a weight ratio of 40:60 on the two-layer core, a cover having a thickness of 1.95 mm was formed to prepare a three-piece golf ball.

The properties of the ball are shown in Table 4.

TABLE 4

| | Example 4 |
| --- | --- |
| Core hardness (mm) | 2.54 |
| Ball hardness (mm) | 2.10 |
| Core/ball hardness ratio | 1.17 |
| Cover thickness (mm) | 1.95 |
| Cover hardness (Shore D) | 56 |
| Spin (rpm) | |
| #PW | 9400 |
| #W1 | 3050 |
| Spin factor* | 1.468 |
| Feel | ○ |
| Driver flying distance (m) | 224.0 |
| Landing – to – stop distance (m) | −1.0 |
| Stop on the green | ○ |

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball comprising a core and a cover enclosing the core, the hardness of said core divided by the hardness of the ball being 1.00 to 1.20 wherein the core hardness and ball hardness are distortions measured in mm of the core and ball under a load of 100 kg, said cover having a one-layer construction, and a thickness of 1.85 to 2.35 mm, consisting essentially of an ionomer resin, and having a Shore D hardness of up to 60.

2. A golf ball according to claim 1 which has a spin quantity when hit by a pitching wedge and a spin quantity when hit by a driver, the ratio of the former to the latter spin quantity divided by the ball hardness being in the range of 1.0 to 1.5.

3. The golf ball according to claim 1, wherein the hardness of the core divided by the hardness of the ball is 1.00 to 1.15.

4. The golf ball according to claim 1, wherein the Shore D hardness of the cover is 55 to 60.

5. The golf ball according to claim 1, wherein the thickness of the cover is 1.85 to 2.10 mm.

6. The golf ball according to claim 1, wherein the core comprises a base rubber of 1,4-polybutadiene containing at least 40% of cis-configuration.

\* \* \* \* \*